(12) United States Patent
Nakajima et al.

(10) Patent No.: US 9,759,952 B2
(45) Date of Patent: Sep. 12, 2017

(54) GLASS CELL, LIQUID CRYSTAL ELEMENT, GLASS CELL MANUFACTURING METHOD, AND LIQUID CRYSTAL ELEMENT MANUFACTURING METHOD

(71) Applicant: NIPPON ELECTRIC GLASS CO., LTD., Otsu-shi, Shiga (JP)

(72) Inventors: Sotohiro Nakajima, Ostu (JP); Masaaki Kadomi, Otsu (JP); Tomoaki Kawamura, Otsu (JP); Takumi Murakami, Otsu (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 0 days.

(21) Appl. No.: 14/373,952

(22) PCT Filed: Jan. 28, 2013

(86) PCT No.: PCT/JP2013/051717
§ 371 (c)(1),
(2) Date: Jul. 23, 2014

(87) PCT Pub. No.: WO2013/121865
PCT Pub. Date: Aug. 22, 2013

(65) Prior Publication Data
US 2015/0010729 A1    Jan. 8, 2015

(30) Foreign Application Priority Data

Feb. 16, 2012 (JP) .................................. 2012-031462

(51) Int. Cl.
G02F 1/1339 (2006.01)
C03C 27/02 (2006.01)
(Continued)

(52) U.S. Cl.
CPC ............ *G02F 1/1339* (2013.01); *C03C 27/02* (2013.01); *C03C 27/08* (2013.01); *G02F 1/1341* (2013.01);
(Continued)

(58) Field of Classification Search
None
See application file for complete search history.

(56) References Cited

U.S. PATENT DOCUMENTS 4,135,789 A * 1/1979 Hall ...................... G02F 1/1341
349/154
6,554,671 B1 * 4/2003 Hofmann ................ H01J 9/185
313/422

(Continued)

FOREIGN PATENT DOCUMENTS

CN      101030510 A    9/2007
CN      101589336 A    11/2009
(Continued)

OTHER PUBLICATIONS

Official Communication issued in International Patent Application No. PCT/JP2013/051717, dated Apr. 16, 2013.
(Continued)

*Primary Examiner* — Anthony J Frost
(74) *Attorney, Agent, or Firm* — Keating and Bennett, LLP (57) ABSTRACT

Provided is a glass cell in which the thickness of the interior space has high uniformity. A glass cell (1) includes first and second glass sheets (11, 12) and an intermediate sheet (13). The first and second glass sheets (11, 12) are disposed to face each other at a distance. The intermediate sheet (13) is disposed between the first glass sheet (11) and the second glass sheet (12). The intermediate sheet (13) includes an opening (13*a*). A surface of the intermediate sheet (13) next (Continued)

to the first glass sheet (11) or a surface of the first glass sheet (11) next to the intermediate sheet (13) is made of metal and a surface of the intermediate sheet (13) next to the second glass sheet (12) or a surface of the second glass sheet (12) next to the intermediate sheet (13) is made of metal. One of both surface layers of the intermediate sheet (13) and the first glass sheet (11) are anodically bonded together and the other surface layer of the intermediate sheet (13) and the second glass sheet (12) are anodically bonded together.

13 Claims, 10 Drawing Sheets (51) Int. Cl.
 *G02F 1/1341* (2006.01)
 *C03C 27/08* (2006.01)
(52) U.S. Cl.
 CPC ..... *B32B 2457/202* (2013.01); *Y10T 428/239* (2015.01)

(56) References Cited

U.S. PATENT DOCUMENTS

| | | | | |
|---|---|---|---|---|
| 2001/0026121 | A1* | 10/2001 | Khan | G02F 1/13394 313/483 |
| 2006/0071324 | A1* | 4/2006 | Lu | B81C 1/00269 257/704 |
| 2007/0205721 | A1 | 9/2007 | Son | |
| 2009/0322994 | A1* | 12/2009 | Satake | C09J 133/02 349/96 |
| 2009/0323004 | A1* | 12/2009 | Ide | G02F 1/1339 349/143 |
| 2010/0091233 | A1 | 4/2010 | Yamagishi | |
| 2011/0007260 | A1* | 1/2011 | Chien | C09K 19/02 349/186 |
| 2011/0050043 | A1 | 3/2011 | Sugiyama | |
| 2011/0279767 | A1 | 11/2011 | Yamagishi | |
| 2013/0070192 | A1 | 3/2013 | Ide et al. | |

FOREIGN PATENT DOCUMENTS

| | | |
|---|---|---|
| CN | 101997502 A | 3/2011 |
| JP | 04-012429 A | 1/1992 |
| JP | 04-067124 A | 3/1992 |
| JP | 2009-215099 A | 9/2009 |
| JP | 2010-039231 A | 2/2010 |
| JP | 2011-175104 A | 9/2011 |
| WO | 2011/111869 A1 | 9/2011 |

OTHER PUBLICATIONS

Official Communication issued in corresponding Japanese Patent Application No. 2013-504028, dated Jun. 28, 2016.

* cited by examiner

GLASS CELL, LIQUID CRYSTAL ELEMENT, GLASS CELL MANUFACTURING METHOD, AND LIQUID CRYSTAL ELEMENT MANUFACTURING METHOD

TECHNICAL FIELD

The present invention relates to glass cells, liquid crystal elements, glass cell manufacturing methods, and liquid crystal element manufacturing methods.

BACKGROUND ART

Glass cells have heretofore been used for various applications, including prepared slides and liquid crystal elements. For example, Patent Literature 1 describes a glass cell composed of a pair of glass sheets and a thin ribbon of glass disposed between the pair of glass sheets and having an opening formed therein.

CITATION LIST

Patent Literature

Patent Literature 1: JP-A-2011-175104

SUMMARY OF INVENTION

Technical Problem

Methods for bonding the glass sheet and the ribbon of glass include, for example, a method for bonding them using a resin adhesive. However, when the glass sheet and the ribbon of glass are bonded together using a resin adhesive, there arise a problem of the bonded portion being low in hermeticity, thermal resistance, moisture resistance, and chemical resistance and a problem of low uniformity of the thickness of the interior space.

A principal object of the present invention is to provide a glass cell in which the bonded portion is high in hermeticity, thermal resistance, moisture resistance, and chemical resistance, no gas is produced, and the thickness of the interior space has high uniformity.

Solution to Problem

A glass cell according to the present invention includes first and second glass sheets and an intermediate sheet. The first and second glass sheets are disposed to face each other at a distance. The intermediate sheet is disposed between the first glass sheet and the second glass sheet. The intermediate sheet includes an opening. A surface of the intermediate sheet next to the first glass sheet or a surface of the first glass sheet next to the intermediate sheet is made of metal and a surface of the intermediate sheet next to the second glass sheet or a surface of the second glass sheet next to the intermediate sheet is made of metal. One of both surface layers of the intermediate sheet and the first glass sheet are anodically bonded together and the other surface layer of the intermediate sheet and the second glass sheet are anodically bonded together.

The surface of the intermediate sheet next to the first glass sheet and the surface of the intermediate sheet next to the second glass sheet may be made of metal. In this case, the intermediate sheet may be formed of a metal sheet.

The intermediate sheet may include an intermediate sheet body made of glass or ceramic and metal layers disposed on the intermediate sheet body and forming the surface layers.

Each of the first and second glass sheets preferably contains an alkali metal component.

Both the surface layers of the intermediate sheet preferably contain at least one selected from the group consisting of Al, Si, Fe, Ti, Ni, Cr, and Cu.

The surface of the first glass sheet next to the intermediate sheet and the surface of the second glass sheet next to the intermediate sheet may be made of metal. In this case, the intermediate sheet is preferably made of glass. Each of the first and second glass sheets and the intermediate sheet preferably contains an alkali metal component.

An interior space defined by the first and second glass sheets and the intermediate sheet may be open on both sides in one direction.

A liquid crystal element according to the present invention includes the glass cell according to the present invention and a liquid crystal layer. The liquid crystal layer is sealed in an interior space defined by the first and second glass sheets and the intermediate sheet.

In a first method for manufacturing a glass cell according to the present invention, an intermediate sheet including an opening and both surface layers made of metal is disposed between a first glass sheet and a second glass sheet. A glass cell including the first and second glass sheets and the intermediate sheet is produced by anodically bonding one of both the surface layers of the intermediate sheet and the first glass sheet together and the other surface layer of the intermediate sheet and the second glass sheet together.

In a second method for manufacturing a glass cell according to the present invention, metal layers are formed on respective one surfaces of a first glass sheet and a second glass sheet and an intermediate sheet including an opening is disposed between the first glass sheet and the second glass sheet which are disposed to allow the metal layers to face each other. A glass cell including the first and second glass sheets and the intermediate sheet is produced by anodically bonding one of both the surfaces of the intermediate sheet and the first glass sheet together and the other surface of the intermediate sheet and the second glass sheet together.

In a first method for manufacturing a liquid crystal element according to the present invention, an intermediate sheet including an opening and both surface layers made of metal is disposed between a first glass sheet and a second glass sheet and a glass cell including the first and second glass sheets and the intermediate sheet is produced by anodically bonding one of both the surface layers of the intermediate sheet and the first glass sheet together and the other surface layer of the intermediate sheet and the second glass sheet together. Liquid crystal is sealed into an interior space defined by the first and second glass sheets and the intermediate sheet to produce a liquid crystal element including the glass cell and a liquid crystal layer provided in the interior space.

Furthermore, in a second method for manufacturing a liquid crystal element according to the present invention, metal layers are formed on respective one surfaces of a first glass sheet and a second glass sheet, an intermediate sheet including an opening is disposed between the first glass sheet and the second glass sheet which are disposed to allow the metal layers to face each other, and a glass cell including the first and second glass sheets and the intermediate sheet is produced by anodically bonding one of both the surfaces of the intermediate sheet and the first glass sheet together and the other surface of the intermediate sheet and the second glass sheet together. Liquid crystal is sealed into an interior space defined by the first and second glass sheets and the intermediate sheet to produce a liquid crystal element including the glass cell and a liquid crystal layer provided in the interior space.

Advantageous Effects of Invention

The present invention can provide a glass cell in which the bonded portion is high in hermeticity, thermal resistance, moisture resistance, and chemical resistance, no gas is produced, and the thickness of the interior space has high uniformity.

DESCRIPTION OF EMBODIMENTS

Hereinafter, a description will be given of examples of preferred embodiments for working of the present invention. However, the following embodiments are simply illustrative. The present invention is not at all intended to be limited to the following embodiments.

Throughout the drawings to which the embodiments and the like refer, elements having substantially the same functions will be referred to by the same reference signs. The drawings to which the embodiments and the like refer are schematically illustrated, and the dimensional ratios and the like of objects illustrated in the drawings may be different from those of the actual objects. Different drawings may have different dimensional ratios and the like of the objects. Dimensional ratios and the like of specific objects should be determined in consideration of the following descriptions.

First Embodiment

Figure 1:
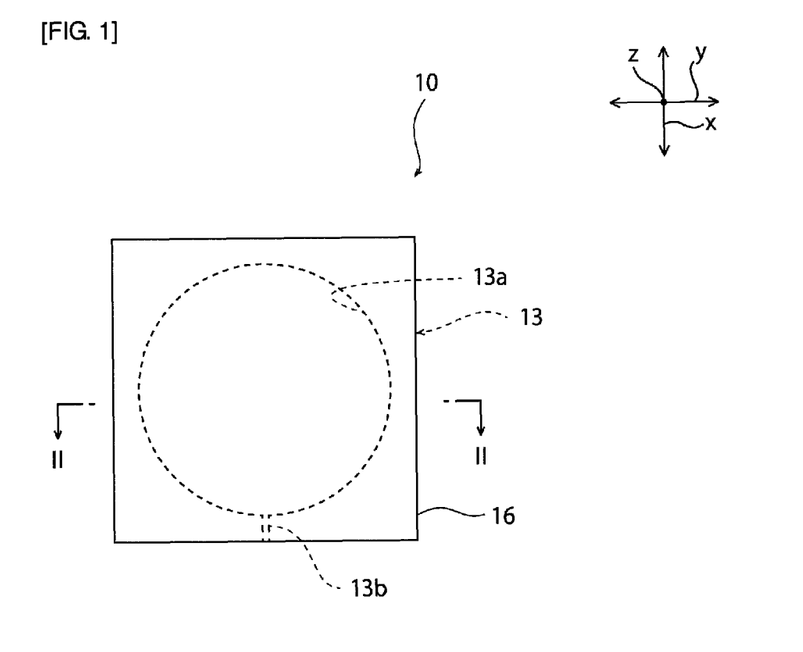
FIG. 1 is a schematic plan view for illustrating a method for manufacturing a glass cell in a first embodiment.
Figure 2:
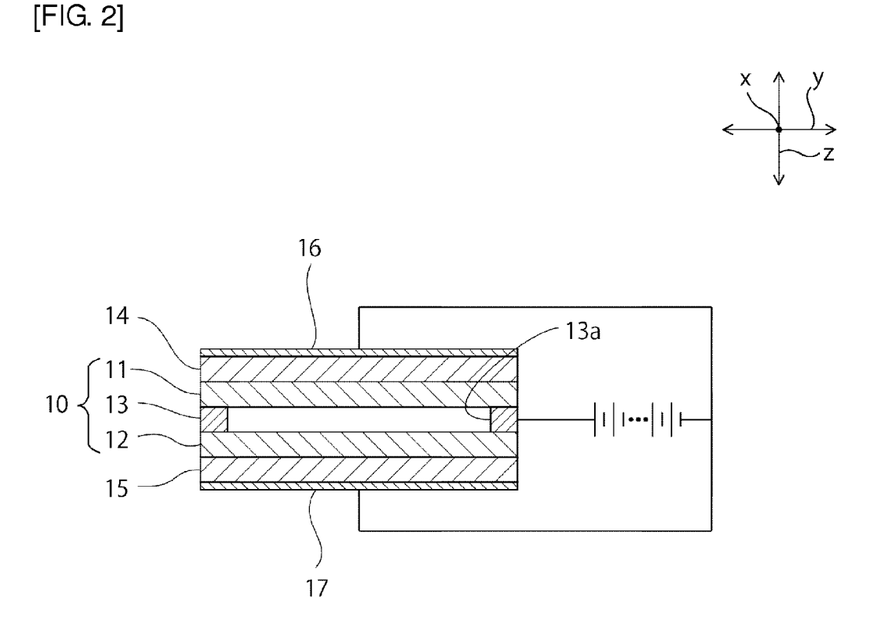
FIG. 2 is a schematic cross-sectional view taken along the line II-II in FIG. 1.

A description will first be given of an example of a method for manufacturing a glass cell 1 shown in FIGS. 3 and 4 mainly with reference to FIGS. 1 and 2.

First, a first glass sheet 11 and a second glass sheet 12 are prepared. Next, an intermediate sheet 13 is disposed between the first glass sheet 11 and the second glass sheet 12 to produce a laminate 10.

The first and second glass sheets 11, 12 are members for forming main walls of a glass cell. The first and second glass sheets 11, 12 are made of glass containing an alkali metal component, such as sodium. The content of alkali metal component in each of the first and second glass sheets 11, 12 is sufficient if it allows anodic bonding. The content of alkali metal component in each of the first and second glass sheets 11, 12 is, in oxide terms, for example, preferably 3 mol % or more, and more preferably 6 mol % or more. Each of the thicknesses of the first and second glass sheets 11, 12 can be, for example, about 0.005 mm to about 2 mm.

The intermediate sheet 13 includes an opening 13a. The opening 13a is communicated with the outside through a communication hole 13b. Both the surface layers of the intermediate sheet 13 are made of metal. In this embodiment, specifically, the entire intermediate sheet 13 is made of metal. In other words, the intermediate sheet 13 is formed of a metal sheet. The intermediate sheet 13 preferably contains at least one selected from the group consisting of, for example, Al, Si, Fe, Ti, Ni, Cr, and Cu. The thickness of the intermediate sheet 13 can be appropriately selected according to the thickness of the interior space of the glass cell 1 or other factors. The thickness of the intermediate sheet 13 can be, for example, about 0.005 mm to about 1 mm.

Next, a glass sheet 14 provided at its one principal surface with an electrode 16 is disposed so that the other principal surface of the glass sheet 14 faces the first glass sheet 11, while a glass sheet 15 provided at its one principal surface with an electrode 17 is disposed so that the other principal surface of the glass sheet 15 faces the second glass sheet 12. Then, a voltage is applied between the intermediate sheet 13 and each of the electrodes 16, 17. Thus, the first glass sheet 11 is anodically bonded to a surface layer of the intermediate sheet 13 next to the first glass sheet 11 and the second glass sheet 12 is anodically bonded to a surface layer of the intermediate sheet 13 next to the second glass sheet 12. Thereafter, the glass sheets 14, 15 and the electrodes 16, 17 are removed, so that a glass cell 1 shown in FIG. 4 can be completed.

Figure 3:
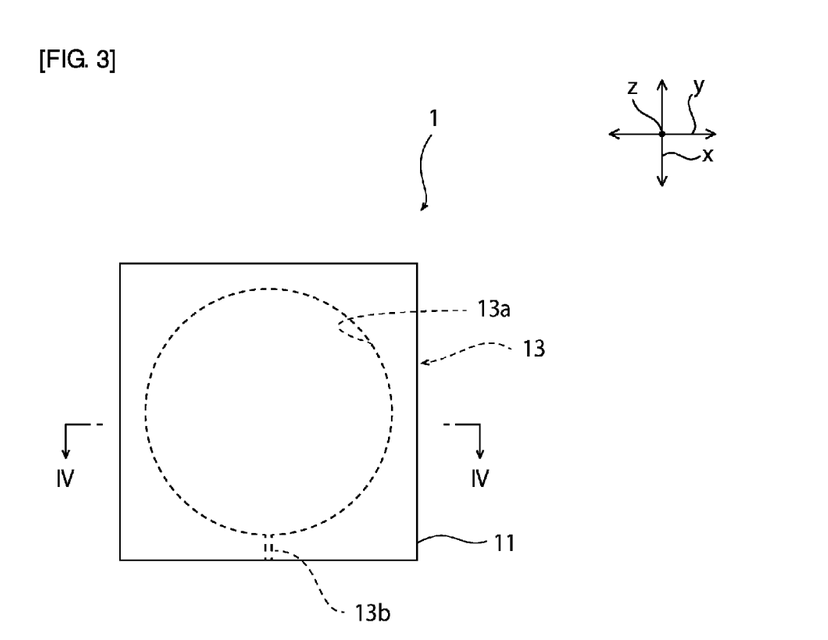
FIG. 3 is a schematic plan view of a glass cell produced in the first embodiment.
Figure 4:
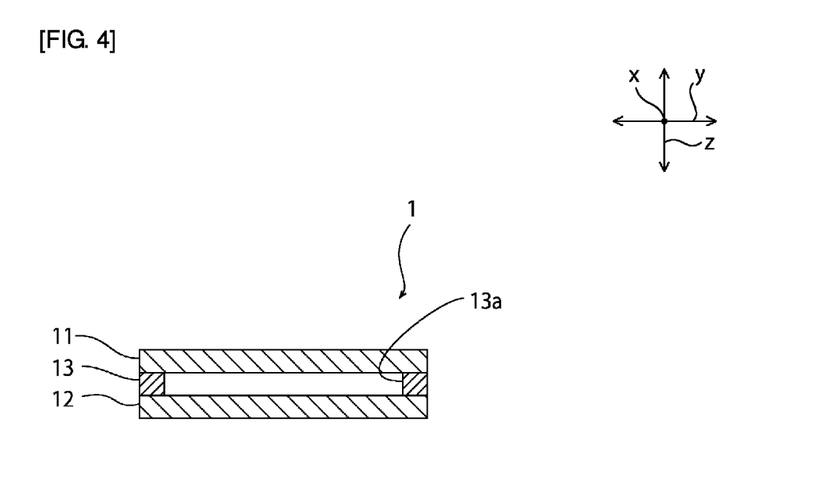
FIG. 4 is a schematic cross-sectional view taken along the line IV-IV in FIG. 3.

As shown in FIGS. 3 and 4, the glass cell 1 includes the first and second glass sheets 11, 12 disposed to face each other at a distance. The intermediate sheet 13 having an opening 13a is disposed between the first glass sheet 11 and the second glass sheet 12. The first glass sheet 11 is anodically bonded to the surface layer of the intermediate sheet 13 next to the first glass sheet 11. The second glass sheet 12 is anodically bonded to the surface layer of the intermediate sheet 13 next to the second glass sheet 12.

The glass cell 1 can be used, for example, for the manufacturing of a liquid crystal element. Specifically, liquid crystal is injected through the communication hole 13b into the interior space defined by the opening 13a and the communication hole 13b is then sealed, so that a liquid crystal element 2 shown in FIG. 5 can be produced. The liquid crystal element 2 includes a liquid crystal layer 21 sealed in the interior space defined by the first glass sheet 11, the second glass sheet 12, and the intermediate sheet 13. The liquid-crystal inlet for use in injecting liquid crystal into the interior space may be provided in a main wall portion of the glass cell 1 or in a sidewall portion thereof. The liquid crystal layer 21 may be divided into a plurality of liquid crystal layers by intermediate sheets. In this case, communication holes are preferably provided to provide communication among the plurality of liquid crystal layers. By doing so, pressure variations among the plurality of liquid crystal layers can be reduced.

By the way, if each of the first and second glass sheets is bonded to the intermediate sheet using a resin adhesive, the bonded portion is likely to deteriorate the hermeticity, thermal resistance, moisture resistance, and chemical resistance and a gas is likely to be produced. Furthermore, the fluidity of the resin adhesive is likely to cause thickness variations in the interior space between the first glass sheet and the second glass sheet. In addition, the gap between the first glass sheet and the second glass sheet increases with the amount of resin adhesive used. Therefore, the gap between the first glass sheet and the second glass sheet is difficult to make small.

Figure 5:
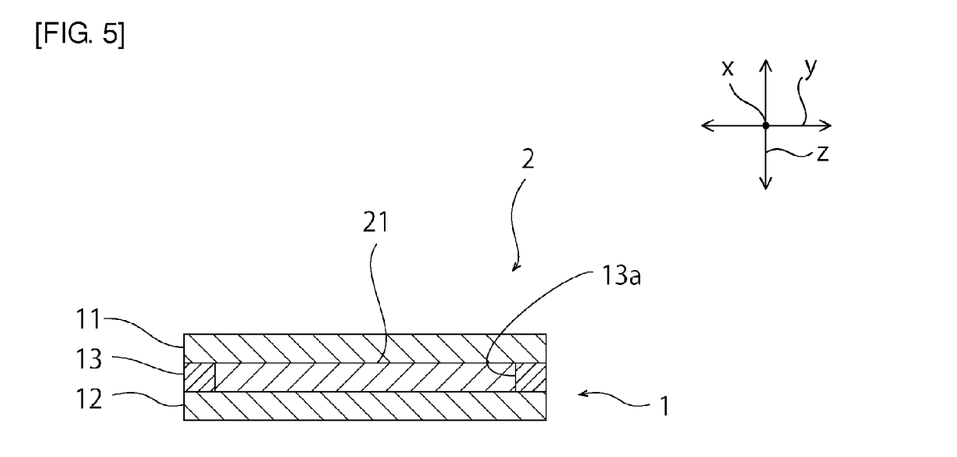
FIG. 5 is a schematic cross-sectional view of a liquid crystal element produced in the first embodiment.

As contrasted with the above, in the glass cell 1, each of the first and second glass sheets 11, 12 is anodically bonded directly to the intermediate sheet 13. In this case, the bonded portion is high in hermeticity, thermal resistance, moisture resistance, and chemical resistance and no gas is produced. Therefore, the deterioration of the liquid crystal element 2 can be prevented. Furthermore, since each glass sheet 11, 12 and the intermediate sheet 13 can be bonded together by applying a voltage in close contact of the glass sheet 11, 12 with the intermediate sheet 13, this makes it less likely that thickness variations in the interior space between the first glass sheet 11 and the second glass sheet 12 occur. Moreover, since there is no need for resin adhesive, the gap between the first glass sheet 11 and the second glass sheet 12 can be easily made small. Therefore, a glass cell 1 can be obtained which has a narrow gap and reduced thickness variations. As a result, it becomes possible to achieve a high-performance liquid crystal element 2 including a liquid crystal layer 21 of small thickness and reduced thickness variations.

In addition, since there is no need for resin adhesive in producing the glass cell 1, this prevents the ingress of resin or bleed into the interior space. Therefore, with the use of the glass cell 1, the elution of resin or bleed into the liquid crystal layer 21 can be prevented.

As another method for directly bonding the glass sheet and the intermediate sheet together, it may be considered to bond them together by irradiating the glass sheet or the like with laser light beams to melt it. However, in this case, it is necessary to heat the glass sheet or the like to a temperature that allows part of the glass sheet or the like to soften. This may deform or break the glass sheet or the like.

As compared with the above, in the case of anodic bonding as in this embodiment, the temperatures of the glass sheets 11, 12 and the intermediate sheet 13 do not rise so high. Therefore, the glass sheets 11, 12 and the intermediate sheet 13 can be effectively prevented from deforming and breaking. Therefore, the glass cells 1 can be manufactured with a high yield.

In this embodiment, the entire intermediate sheet 13 is made of metal. Therefore, the intermediate sheet 13 has malleability. For this reason, when stress is applied to the glass cell 1, such as by a change in the temperature of the glass cell 1, the stress is reduced by the intermediate sheet 13 having malleability. Specifically, for example, when liquid crystal is sealed in the glass cell 1, a temperature increase of the glass cell 1 causes the liquid crystal sealed therein to thermally expand to a larger extent than the glass cell 1, which tends to increase the internal pressure. This increase in internal pressure is reduced by the intermediate sheet 13.

From the viewpoint of reducing the stress applied to the glass cell 1, it is preferred to make each of the glass sheets 11, 12 and the intermediate sheet 13 from a high-thermal expansion material to reduce the difference in coefficient of thermal expansion between each of the glass sheets 11, 12 and intermediate sheet 13 and the liquid crystal layer.

Although in this embodiment the description has been given of the glass cell 1 having a single interior space, the interior space may be divided into plural sections along the thickness direction, for example, by one or more glass sheets or the like.

Figure 16:
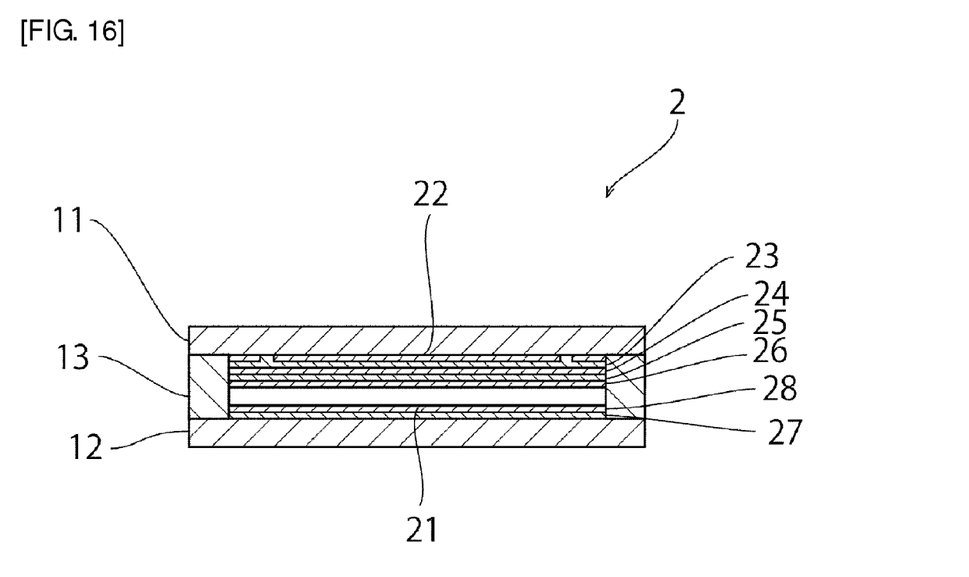
FIG. 16 is a schematic cross-sectional view of the liquid crystal element produced in the first embodiment.

FIG. 16 is a schematic cross-sectional view specifically showing the structure of the liquid crystal element 2 shown in FIG. 5. As shown in FIG. 16, in the liquid crystal element 2, a first electrode 22, a first insulating layer 23, a high-resistivity layer 24, a second insulating layer 25, and a first alignment film 26 are arranged in this order on a surface of the glass sheet 11 facing the liquid crystal layer 21. On the other hand, a second electrode 27 and a second alignment film 28 are arranged in this order on a surface of the glass sheet 12 facing the liquid crystal layer.

Each of the first and second electrodes 22, 27 is made of a transparent conductive oxide, such as indium tin oxide (ITO).

Each of the insulating layers 23, 25 is made of silicon oxide or the like.

The high-resistivity layer 24 is made of, for example, zinc oxide, zinc oxide doped with aluminum or the like, or like materials.

Each of the first and second alignment films 26, 28 is made of, for example, polyimide or the like.

An intermediate-refractive index layer made of, for example, aluminum oxide or the like, may be further disposed between the first electrode 22 having a relatively high refractive index and the first insulating layer 23 having a relatively low refractive index, wherein the refractive index of the intermediate-refractive index layer is somewhere between those of the first electrode 22 and the first insulating layer 23. By providing the intermediate-refractive index layer, the optical reflectance at the interface between the first electrode 22 and the first insulating layer 23 can be reduced.

From the viewpoint of reducing the optical reflectance, it is preferred that the glass sheet 11 should be made of a glass having a refractive index close to that of the first electrode 22. Also, it is preferred that the glass sheet 12 should be made of a glass having a refractive index close to that of the second electrode 27.

A description will be given below of modifications and another embodiment. In the following description, members having substantially the same functions as in the first embodiment are referred to by common reference numerals and further explanation thereof will be omitted.

First Modification

Figure 6:
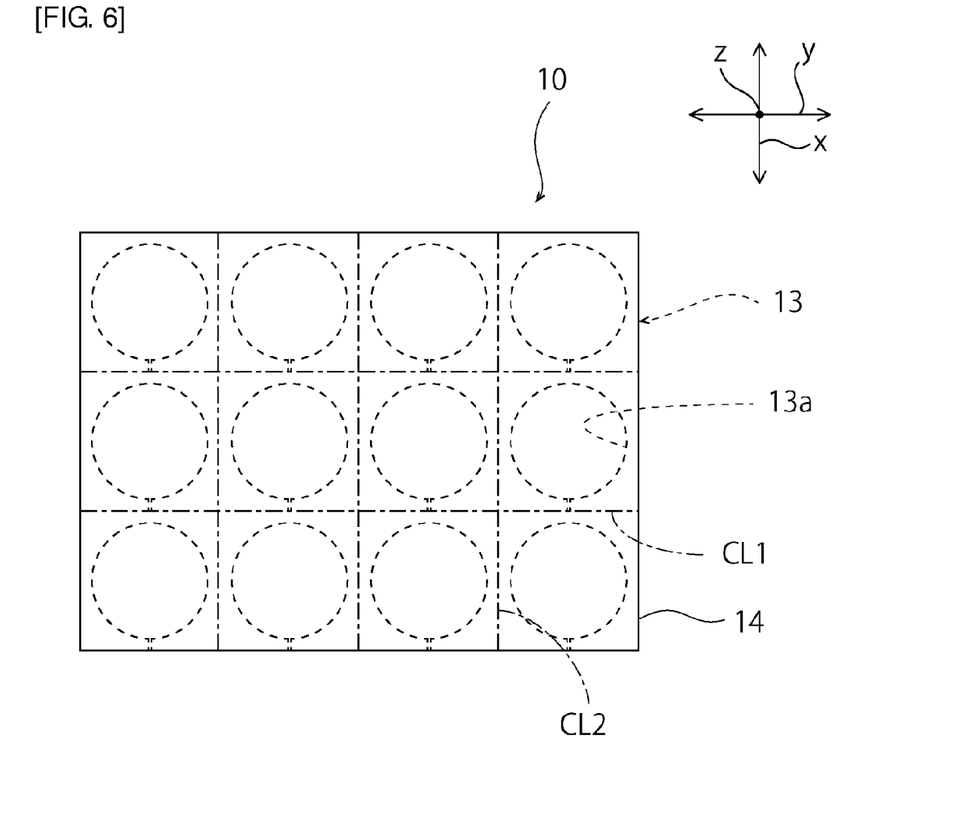
FIG. 6 is a schematic plan view for illustrating a method for manufacturing a glass cell in a modification (first modification) of the first embodiment.

FIG. 6 is a schematic plan view for illustrating a method for manufacturing a glass cell in a modification (first modification) of the first embodiment.

In the first modification, as shown in FIG. 6, an intermediate sheet 13 having a plurality of openings 13a is used. Then, after anodic bonding, the laminate is cut along cut lines CL1 ad cut lines CL2 to concurrently manufacture a plurality of glass cells 1. By doing this way, a plurality of glass cells 1 can be manufactured with high efficiency.

Second Modification

Figure 7:
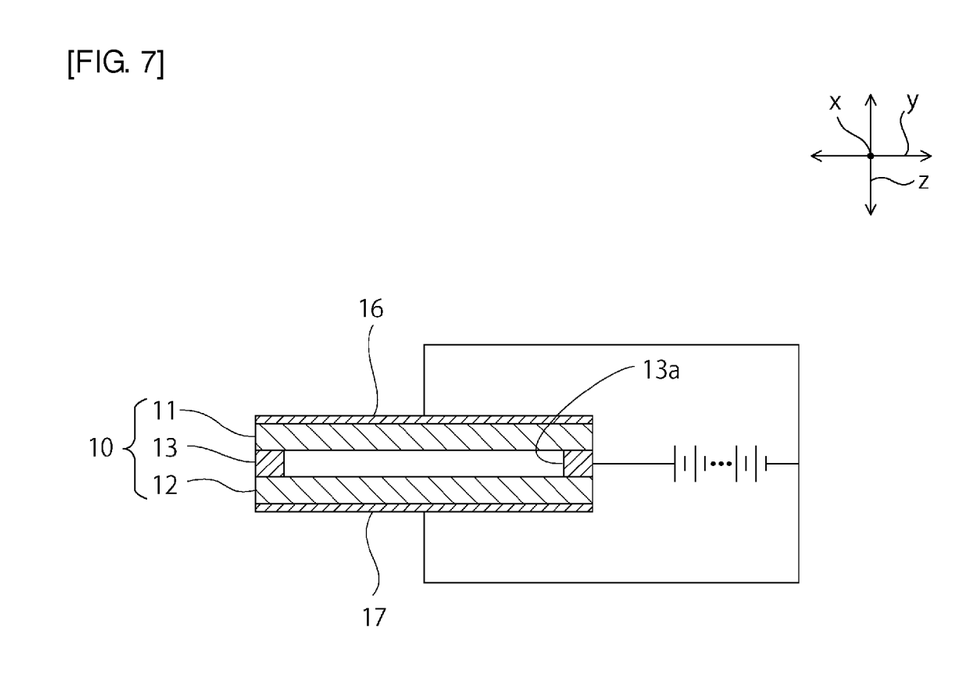
FIG. 7 is a schematic cross-sectional view for illustrating a method for manufacturing a glass cell in a modification (second modification) of the first embodiment.

FIG. 7 is a schematic cross-sectional view for illustrating a method for manufacturing a glass cell in a modification (second modification) of the first embodiment.

In the first embodiment, the description has been given of an example where anodic bonding is performed by using glass sheets 14, 15 provided with their respective electrodes 16, 17 to apply a voltage thereto. However, the present invention is not limited to this. For example, as shown in FIG. 7, an electrode 16 may be provided on the first glass sheet 11, an electrode 17 may be provided on the second glass sheet 12, and a voltage may be applied to the laminate 10. In this case, after anodic bonding, the electrodes 16, 17 may be removed or may not be removed. For example, when the electrodes 16, 17 are made of a transparent conductive oxide to have light permeability, the product may be applicable as a glass cell 1 having light permeability without having to remove the electrodes 16, 17. Methods for removing the electrodes 16, 17 include an etching method using an etching liquid and physical polishing methods, such as blasting.

Second Embodiment

Figure 8:
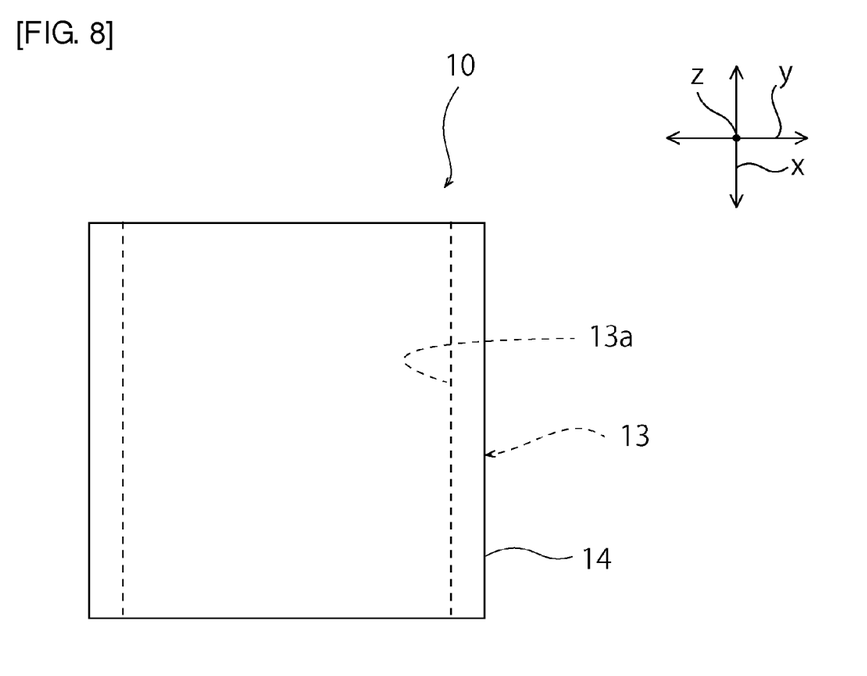
FIG. 8 is a schematic plan view for illustrating a method for manufacturing a glass cell in a second embodiment.

FIG. 8 is a schematic plan view for illustrating a method for manufacturing a glass cell in a second embodiment.

In the first embodiment, the description has been given of an example where the intermediate sheet 13 having a circular opening 13a is used. However, the present invention is not limited to this configuration. For example, as shown in FIG. 8, an intermediate sheet 13 having an opening 13a open on both sides in the direction x may be used. In this case, a glass cell can be produced in which the interior space is open on both sides in the direction x. This glass cell can be suitably used, for example, as a prepared slide.

Third and Forth Modifications

Figure 9:
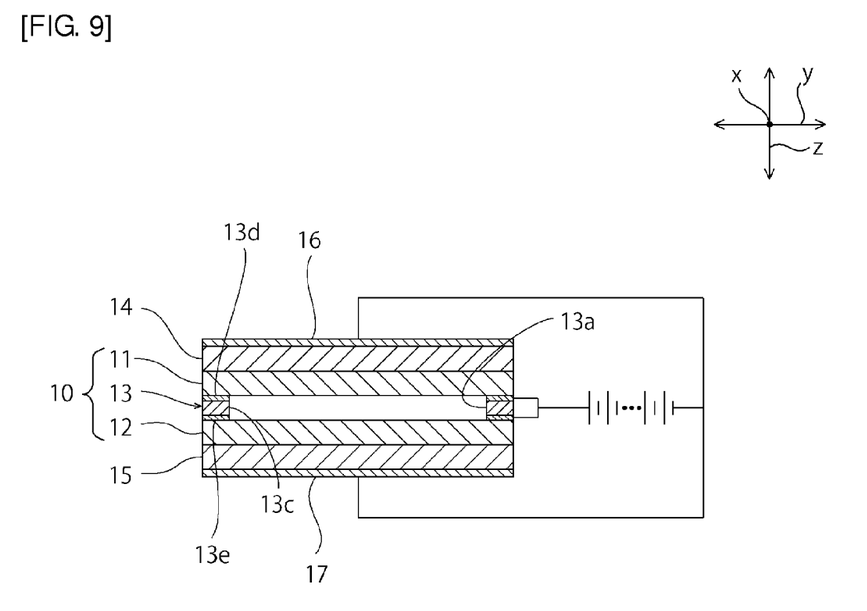
FIG. 9 is a schematic cross-sectional view for illustrating a method for manufacturing a glass cell in a third modification.
Figure 10:
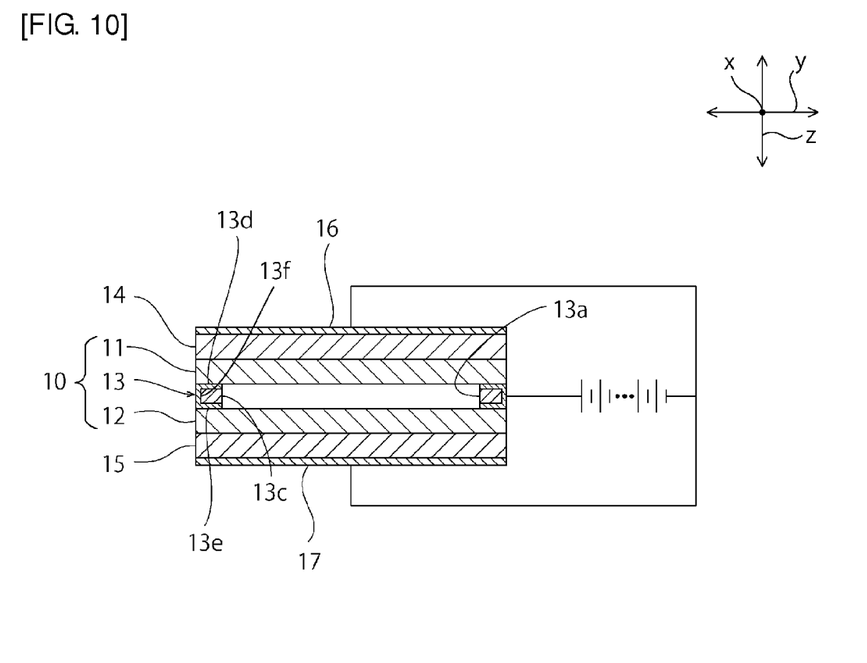
FIG. 10 is a schematic cross-sectional view for illustrating a method for manufacturing a glass cell in a fourth modification.

FIG. 9 is a schematic cross-sectional view for illustrating a method for manufacturing a glass cell in a third modification. FIG. 10 is a schematic cross-sectional view for illustrating a method for manufacturing a glass cell in a fourth modification.

In the first embodiment, the description has been given of an example where the entire intermediate sheet 13 is made of metal. However, the present invention is not limited to this configuration. For example, as shown in FIG. 9, the intermediate sheet 13 may be composed of an intermediate sheet body 13c made of glass or ceramic and metal layers 13d, 13e disposed on the intermediate sheet body 13c. Alternatively, as shown in FIG. 10, the intermediate sheet 13 may further include a metal layer 13f exposed on outside end surfaces of the intermediate sheet 13 and connecting the metal layer 13d and the metal layer 13e. In this case, voltage application to the metal layers 13d, 13e can be easily achieved.

The intermediate sheet 13 may be formed of a glass sheet or a ceramic sheet and metal sheets may be provided on the surfaces of the glass sheets 11, 12 facing the intermediate sheet.

When the intermediate sheet 13 includes a glass sheet, the intermediate sheet 13 including a curved glass sheet is preferably used for anodic bonding. For example, if the glass sheet has high flatness, bubbles are likely to remain between the intermediate sheet 13 and each of the glass sheets 11, 12. With the use of the intermediate sheet 13 including a curved glass sheet, the remaining of bubbles between the intermediate sheet and each glass sheet 11, 12 can be reduced. The cross-sectional shape of the glass sheet may be, for example, arcuate, tortuous or zigzag. The gap produced between a flat sheet and the glass sheet when the glass sheet is placed on the flat sheet is preferably 0.001 to 0.5 times and more preferably 0.001 times to 0.1 times the thickness of the glass sheet. If the gap produced between the surfaces of the flat sheet and the glass sheet when the glass sheet is placed on the flat sheet is too small, bubbles may be likely to remain between the intermediate sheet 13 and each glass sheet 11, 12. If the gap produced between the surfaces of the flat sheet and the glass sheet when the glass sheet is placed on the flat sheet is too large, this may make it difficult to anodically bond the intermediate sheet 13 to each glass sheet 11, 12.

In these modifications, each of the first and second glass sheets 11, 12 and the intermediate sheet body 13c preferably contains an alkali metal component.

Fifth Modification

Figure 11:
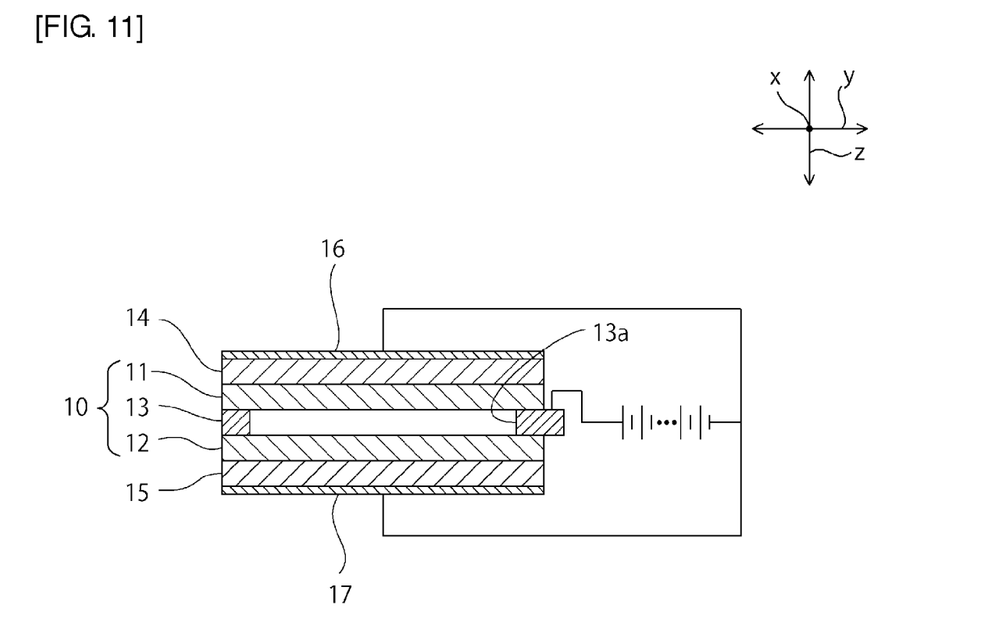
FIG. 11 is a schematic cross-sectional view for illustrating a method for manufacturing a glass cell in a fifth modification.

FIG. 11 is a schematic cross-sectional view for illustrating a method for manufacturing a glass cell in a fifth modification.

As shown in FIG. 11, in this modification, the intermediate sheet 13 in the laminate 10 is extended out to the outside beyond the first and second glass sheets 11, 12. In other words, a portion of the intermediate sheet 13 is provided in a region where the first and second glass sheets 11, 12 are not provided any more. In plan view, the intermediate sheet 13 is exposed to the outside. Therefore, an electrical contact with the intermediate sheet 13 can be easily ensured. Hence, anodic bonding can be easily performed.

Sixth and Seventh Modifications

Figure 12:
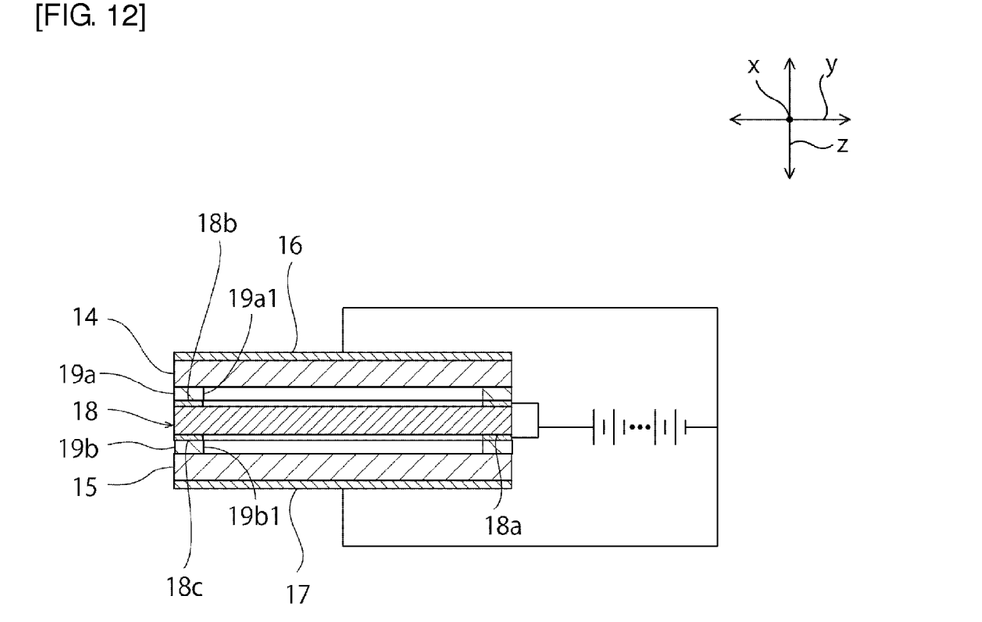
FIG. 12 is a schematic cross-sectional view for illustrating a method for manufacturing a glass cell in a sixth modification.
Figure 13:
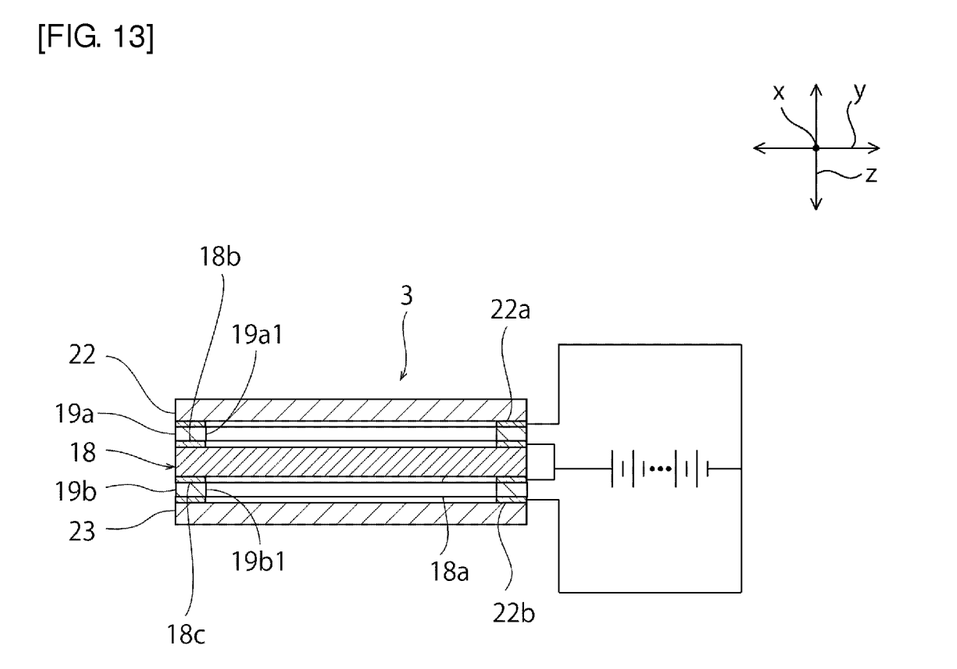
FIG. 13 is a schematic cross-sectional view for illustrating the method for manufacturing a glass cell in the sixth modification.

FIGS. 12 and 13 are schematic cross-sectional views for illustrating a method for manufacturing a glass cell in a sixth modification. In this modification, a description will be given of an example of a method for manufacturing a glass cell including a plurality of interior spaces each for forming a liquid crystal layer.

First, as shown in FIG. 12, a sheet 18 including a flat sheet body 18a made of glass and metal layers 18b, 18c provided on both the surfaces of the sheet body 18a is anodically bonded to sheets 19a, 19b having their respective openings 19a1, 19b1 in the same manner as in the above embodiments and modifications.

Next, as shown in FIG. 13, a laminate of the sheets 18, 19a, 19b is anodically bonded to sheets 22, 23 of glass provided with metal layers 22a, 22b on their surfaces. Thus, a glass cell 3 can be completed which includes the sheets 18, 19a, 19b and the sheets 22, 23 and has a plurality of interior spaces. As seen from this, the present invention is also applicable to a glass cell having a plurality of interior spaces.

Figure 14:
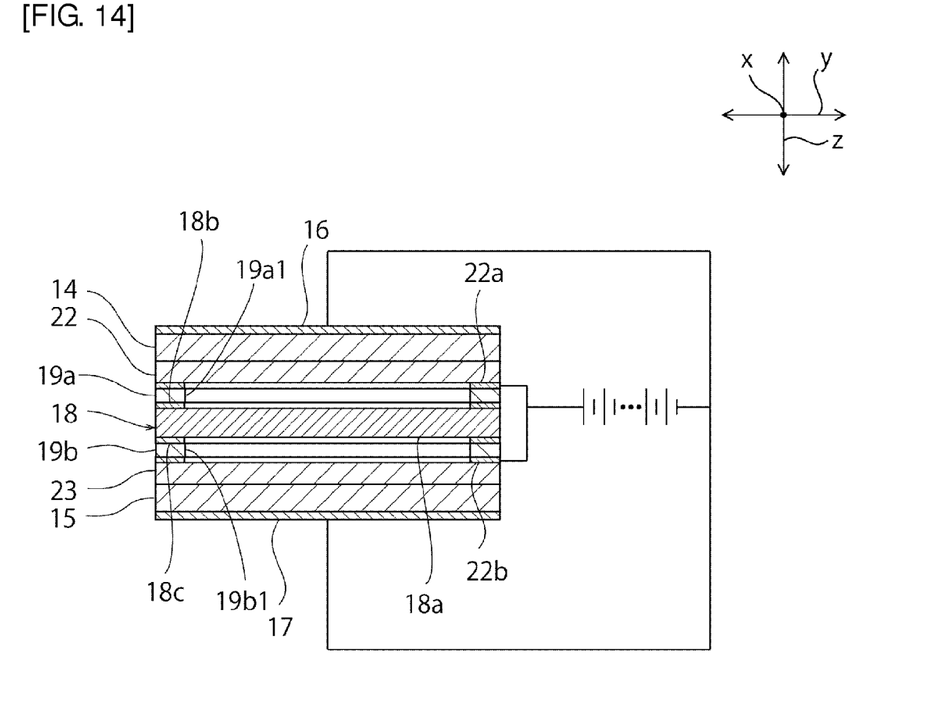
FIG. 14 is a schematic cross-sectional view for illustrating a method for manufacturing a glass cell in a seventh modification.

Alternatively, a glass cell having a plurality of interior spaces may be produced in the following manner. Specifically, after the sheet 18 including metal layers 18b, 18c is anodically bonded to the sheets 19a, 19b as shown in FIG. 12, metal layers 22a, 22b are formed on the sheets 19a, 19b, respectively. Next, as shown in FIG. 14, a glass sheet 22 and a glass sheet 14 provided with an electrode 16 may be disposed in this order on the metal layer 22a, a glass sheet 23 and a glass sheet 15 provided with an electrode 17 may be disposed in this order on the metal layer 22b, and a voltage may be applied between the electrodes 22a, 22b and the electrodes 16, 17 to anodically bond the metal layers 22a, 22b to the glass sheets 22, 23, respectively.

Eighth Modification

Figure 15:
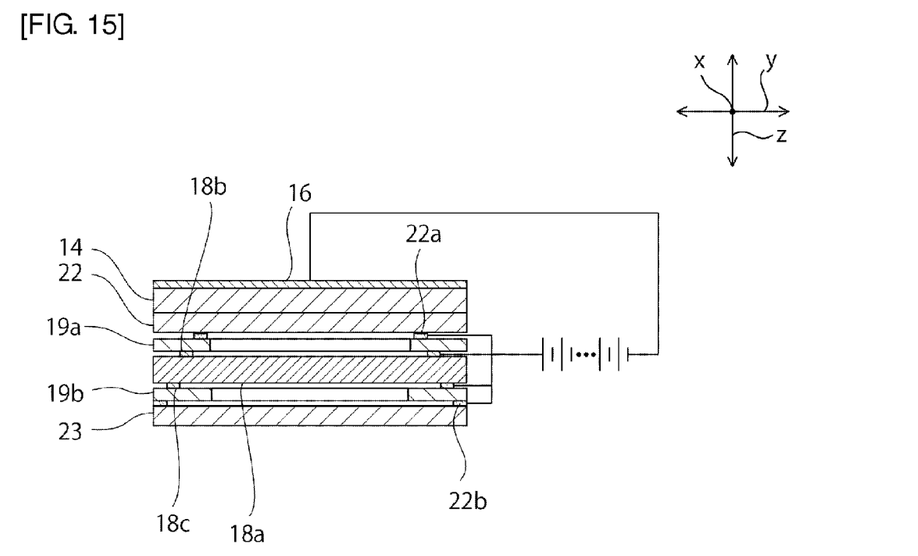
FIG. 15 is a schematic cross-sectional view for illustrating a method for manufacturing a glass cell in an eighth modification.

FIG. 15 is a schematic cross-sectional view for illustrating a method for manufacturing a glass cell in an eighth modification. As shown in FIG. 15, when the electrodes 22b, 18c, 18b, 22a are arranged not to overlap each other as viewed from the direction of application of the voltage, a pair of the electrode 22b provided on the glass sheet 23 and the intermediate sheet 19b made of glass, a pair of the electrode 18c provided on the glass sheet 19b made of glass and the glass sheet 18a, a pair of the electrode 18b provided on the glass sheet 18a and the intermediate sheet 19a made of glass, and a pair of the electrode 22a provided on the intermediate sheet 19a made of glass and the glass sheet 22 can be concurrently anodically bonded in a single step. Needless to say, the anodically bonding step may be carried out in four batches.

REFERENCE SIGNS LIST 1, 3 . . . glass cell
2 . . . liquid crystal element
10 . . . laminate
11 . . . first glass sheet
12 . . . second glass sheet
13, 19a, 19b . . . intermediate sheet
13a . . . opening
13b . . . communication hole
13c . . . intermediate sheet body
13d, 13e, 13f, 18b, 18c, 22a, 22b . . . metal layer
14, 15 . . . glass sheet
16, 17 . . . electrode
18, 22, 23 . . . sheet
18a . . . sheet body
21 . . . liquid crystal layer

The invention claimed is:

1. A glass cell comprising:
   first and second glass sheets disposed to face each other at a distance; and
   an intermediate sheet disposed between the first glass sheet and the second glass sheet, wherein
   the intermediate sheet is a metal sheet including an opening and first and second surface layers opposed to each other,
   the first surface layer of the intermediate sheet is anodically bonded to the first glass sheet and the second surface layer of the intermediate sheet is anodically bonded to the second glass sheet, and
   an interior space is defined by the first and second glass sheets and the opening of the metal sheet.

2. A glass cell comprising:
   first and second glass sheets disposed to face each other at a distance; and
   an intermediate sheet disposed between the first glass sheet and the second glass sheet and including an opening, wherein
   the intermediate sheet includes an intermediate sheet body made of glass or ceramic, a first metal layer disposed on one end of the intermediate sheet body, and a second metal layer disposed on the other end of the intermediate sheet body,
   the first metal layer is anodically bonded to the first glass sheet and the second metal layer is anodically bonded to the second glass sheet, and
   the first and second metal layers of the intermediate sheet contain at least one selected from the group consisting of Al, Si, Fe, Ti, and Cr, and
   an interior space is defined by the first and second glass sheets and the opening of the intermediate sheet.

3. The glass cell according to claim 1, wherein each of the first and second glass sheets contains an alkali metal component.

4. A glass cell comprising:
   first and second glass sheets disposed to face each other at a distance; and
   an intermediate sheet disposed between the first glass sheet and the second glass sheet and including an opening, wherein
   the intermediate sheet is made of glass, and a surface of the first glass sheet next to the intermediate sheet and a surface of the second glass sheet next to the intermediate sheet contain at least one selected from the group consisting of Al, Si, Fe, Ti, and Cr, and
   one surface of the intermediate sheet is anodically bonded to the metal surface of the first glass sheet and the other surface of the intermediate sheet is anodically bonded to the metal surface of the second glass sheet, and
   an interior space is defined by the first and second glass sheets and the opening of the intermediate sheet.

5. The glass cell according to claim 4, wherein each of the first and second glass sheets and the intermediate sheet contains an alkali metal component.

6. A liquid crystal element comprising:
   the glass cell according to claim 1; and
   a liquid crystal layer sealed in the interior space.

7. A method for manufacturing the glass cell according to claim 2, wherein the glass cell including the first and second glass sheets and the intermediate sheet is produced by anodically bonding the first metal layer of the intermediate sheet and the first glass sheet together and the second metal layer of the intermediate sheet and the second glass sheet together.

8. A method for manufacturing the glass cell according to claim 4, wherein the metal surfaces are formed on the first glass sheet and the second glass sheet, the intermediate sheet including the opening is disposed between the first glass sheet and the second glass sheet which are disposed to allow the metal surfaces to face each other, and the glass cell including the first and second glass sheets and the intermediate sheet is produced by anodically bonding one surface of the intermediate sheet and the first glass sheet together and the other surface of the intermediate sheet and the second glass sheet together.

9. A method for manufacturing the liquid crystal element according to claim 6, the method comprising the steps of:
   disposing, between the first glass sheet and the second glass sheet, the intermediate sheet made of metal and including the opening, and anodically bonding the one surface layer of the intermediate sheet and the first glass sheet together and the other surface layer of the intermediate sheet and the second glass sheet together to produce the glass cell including the first and second glass sheets and the intermediate sheet; and sealing liquid crystal into the interior space to produce the liquid crystal element including the glass cell and a liquid crystal layer provided in the interior space.

10. A liquid crystal element comprising:

the glass cell according to claim 4; and a liquid crystal layer sealed in the interior space.

11. A method for manufacturing the liquid crystal element according to claim 10, the method comprising the steps of:

forming the metal surfaces on respective surfaces of the first glass sheet and the second glass sheet, disposing the intermediate sheet including the opening between the first glass sheet and the second glass sheet which are disposed to allow the metal surfaces to face each other, and anodically bonding one surface of the intermediate sheet and the first glass sheet together and the other surface of the intermediate sheet and the second glass sheet together to produce the glass cell including the first and second glass sheets and the intermediate sheet; and sealing liquid crystal into the interior space to produce the liquid crystal element including the glass cell and a liquid crystal layer provided in the interior space.

12. The glass cell according to claim 2, wherein each of the first and second glass sheets contains an alkali metal component.

13. A method for manufacturing the glass cell according to claim 1, wherein the intermediate sheet made of metal is disposed between the first glass sheet and the second glass sheet, and the glass cell including the first and second glass sheets and the intermediate sheet is produced by anodically bonding the one surface layer of the intermediate sheet and the first glass sheet together and the other surface layer of the intermediate sheet and the second glass sheet together.

* * * * *